United States Patent

[11] 3,533,515

[72] Inventor Edwin Earl Milner, Jr., York County, Virginia
[21] Appl. No. 757,075
[22] Filed Sept. 3, 1968
[45] Patented Oct. 13, 1970
[73] Assignee Baker Equipment Engineering Company Richmond, Virginia a corporation of Virginia

[54] BOOM STRUCTURE FOR UTILITY TRUCKS AND THE LIKE
17 Claims, 13 Drawing Figs.
[52] U.S. Cl. .................................................. 212/69, 212/66
[51] Int. Cl. ..................................................... B66c 23/86
[50] Field of Search ......................................... 212/66—69, 35, 54

[56] References Cited
UNITED STATES PATENTS
3,448,863 6/1969 Noll .............................. 212/69
3,452,624 7/1969 Lorence ...................... 212/69

Primary Examiner—Harvey C. Hornsby
Attorney—Mason, Fenwick and Lawrence

ABSTRACT: A boom drive structure wherein a boom is connected to an upright pivot tube to be rotated thereby. An eccentric circular periphery cam or cams keyed on the pivot tube and surrounded by a corresponding number of circular drive rings driven by hydraulic cylinder units produce rotation of the pivot tube. The drive mechanism is enclosed in a housing having bridge girder type sidewalls, which housing may form the fluid reservoir for the hydraulic circuit. Cams correlated to the eccentric cam positions control pilot valves to regulate fluid flow to the cylinder units.

Patented Oct. 13, 1970 3,533,515

INVENTOR
EDWIN EARL MILNER, JR.
BY Mason, Fenwick & Lawrence
ATTORNEYS

BOOM STRUCTURE FOR UTILITY TRUCKS AND THE LIKE

BACKGROUND AND OBJECTS OF THE INVENTION

The present invention relates in general to a boom drive mechanism for driving a boom about a generally vertical axis of rotation, and more particularly to a boom pedestal assembly having a hydraulic cylinder drive mechanism adapted to be direct connected to an upright boom supporting pivot tube or pedestal shaft mounted on a utility vehicle for rotating a boom in azimuth.

Service and maintenance trucks employed by public utilities and similar companies are ordinarily provided with some type of boom structure pivotally supported for movement about a horizontal axis on a base or mounting structure, hereinafter generally termed a boom supporting pedestal, which is journaled on the vehicle for rotation about a vertical axis. The boom structure is often used as a derrick for lifting equipment, setting poles, removing wornout or defective poles and replacing them, and similar types of work. The boom structure may also carry a ground auger for drilling pole holes. Such derrick boom structures are often of the telescopically extensible type, having an inner main boom section and an outer extensible boom section, termed a stinger. It has also been a common practice to provide utility trucks with boom structures in the form of articulated booms having an outer boom section pivotally coupled to the inner boom section for angular adjustment about a horizontal axis and having a worker platform or basket at the outer end of the outer boom section to support a worked at elevated position, such structures being commonly termed aerial towers. Such aerial towers are particularly useful in servicing overhead traffic lights, street lamps, elevated signs and similar objects.

The rotating drive system commonly employed for driving such boom structures about a vertical boom pedestal axis have usually employed one of three basic types of drive mechanisms: a cylinder driving a chain which passes about a sprocket keyed to a pivot tube to which the boom is connected, a cylinder driving a cable attached to an anchor point on the frame and to a drum on the pivot tube and passing around suitable sheaving, or gear trains of various sorts.

Such prior art types of boom drive mechanisms have been the source of a number of recognized problems. Where gear drive mechanisms are used, frequently employed in the form of a worm gear drive or a walking pinion arrangement, the gears undergo rather rapid wear and frequently become worn to the point where lockups will occur, freezing the boom at a particular position. Also, as such gears begin to wear out, backlashing conditions arise as the gear teeth no longer interfit with proper tolerances, causing the boom to undergo bouncing or jerky rotation as it is moved in a downhill direction, when the pedestal axis is inclined from true vertical, as when the utility vehicle is parked on the shoulder of a road or on other nonhorizontal terrain, and thus imposing greater dynamic loads on the gear teeth. In a gear or chain drive mechanism, the transfer of load has to be through one tooth or one pin of the chain at a time, thus concentrating the load in a manner producing constant danger of breaking. If, for example, the boom structure is rotating about the pedestal axis and accidentally slams into some stationary objects, or if the boom structure is being used to drag a pole and the pole hits a snag, such a great dynamic load can be applied to the single tooth or chain pin bearing the load as to break off the gear tooth or break the chain pin.

Such prior art boom drive mechanisms also create windmilling problems, as when the boom structure is being rotated when the utility vehicle is situated on a hill, and thus require some type of braking clutch mechanism to prevent unwanted rotation of the boom structure in such uneven terrain situations.

An object of the present invention is the provision of a novel, hydraulic cylinder transmission mechanism for driving boom supporting pivot tubes about a generally vertical axis providing a direct driving connection which minimizes the above described problems.

Another object of the present invention is the provision of a novel boom pedestal rotating mechanism which is extremely compact, especially in vertical dimensions, to minimize the space occupied by the pedestal drive mechanism and render the mechanism readily adapted to being employed as a pedestal mount or as a bridge mount at any of a number of locations on the utility vehicle.

Another object of the invention is the provision of a novel transmission for driving and positioning a boom supporting pivot tube about a generally vertical axis by means of hydraulic cylinders direct connected to pivot tube, which can be readily provided as a package pedestal unit on which any desired type of boom structure can be mounted.

Another object of the present invention is the provision of a novel transmission for driving and positioning a boom supporting pivot tube about a generally vertical axis by means of a pair of hydraulic cylinders direct connected in selected angular relation to the pivot tube, wherein only rotary loading is imposed on the pivot tube and the other loads imposed by the boom structure are transferred to the transmission housing.

Yet another object of the present invention is the provision of a novel dual hydraulic cylinder drive mechanism for driving a boom structure about its pedestal axis or for driving boom sections of an articulated boom structure in angular relation about the articulation axis, which is direct connected to the components in such a manner as to continuously maintain positive control of the positions of the components driven thereby.

Other objects, advantages and capabilities of the present invention will become apparent from the following detailed description, taken in conjunction with the accompanying drawings showing preferred embodiments of the invention.

DETAILED DESCRIPTION OF THE INVENTION

Referring to the drawings wherein like reference characters designate corresponding parts throughout the several FIGS., and particularly to the embodiment shown in FIGS. 1 to 5, the invention is shown for illustrative purposes as applied to a utility maintenance truck 15 equipped with a utility body 16 of conventional configuration including a driver's cab 17 and the usual rearwardly extending panel body 18 having spaced parallel sidewall sections providing, for example, a series of built-in cabinets for the storage of tools, small parts and similar items. The sidewall sections 18' may be spaced laterally from each other and from the rear wall of the cab 17 or a front built-in cabinet wall may be disposed just rearwardly of the cab 17, defining a cargo space which is open at the top and rear. In the example illustrated in FIGS. 1 and 2, the boom supporting pedestal installation is of the type commonly termed a "center mount" installation, wherein the boom supporting pedestal structure is mounted within the open area between the sidewall sections 18' immediately overlying the rear axle.

The boom pedestal assembly, generally indicated by the reference character 19, supports a head structure 20 of generally conventional construction which may take a plurality of differed specific configurations depending upon whether the boom structure is of the derrick type, the aerial tower type, or other conventional types of boom structures. The head structure 20 contains lobe portions 21 for receiving a horizontal pivot shaft 21' to pivotally couple the boom structure 22 to the head structure 20 at a point spaced laterally from the extended vertical axis through the pedestal assembly 19. The boom structure 22 in the embodiment illustrated in FIG. 1 comprises a main or inner boom section 23 having its inner end coupled to the pivot shaft 21' and having an articulation assembly 24 at its outer end forming a pivot coupling with the outer boom section 25, the latter having the usual worker's platforms or baskets 26 pivotally mounted on the free or outer end of the boom section 25. The inner or main boom section 23 is powered for vertical angular movement about the axis of the horizontal pivot shaft 21' in a conventional manner, as by the hydraulic cylinder unit 27 having a cylinder and a movable piston rod, one of which is coupled to the head structure 20 and the other of which is coupled to the inner boom section 23.

Figure 1:
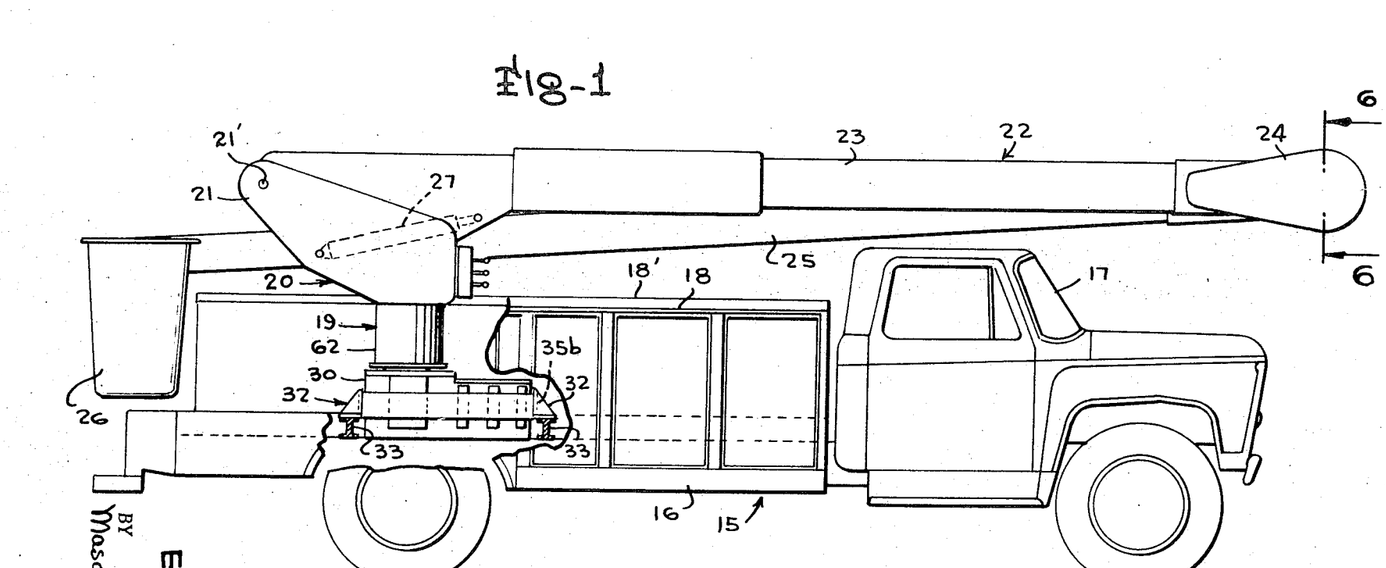
FIG. 1 is a side elevation of a utility maintenance truck having an articulated aerial tower boom structure and a boom supporting pedestal assembly constructed in accordance with a first embodiment of the present invention, illustrated as a center mount installation and having parts of the truck sidewalls broken away to reveal the construction of the pedestal unit.
Figure 2:
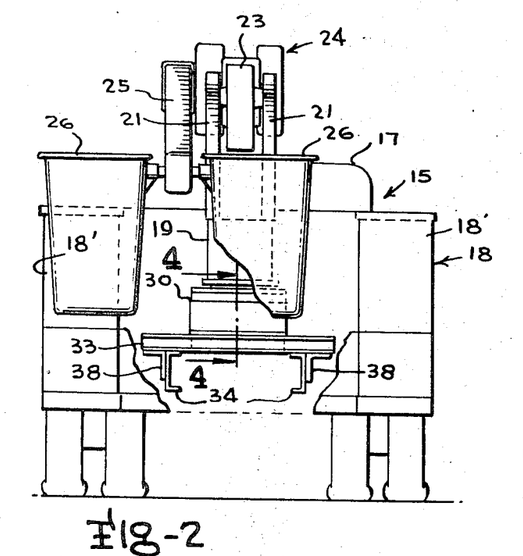
FIG. 2 is a rear elevation view of the utility maintenance truck with parts broken away to reveal the mounting structure for the pedestal drive transmission unit.
Figure 3:
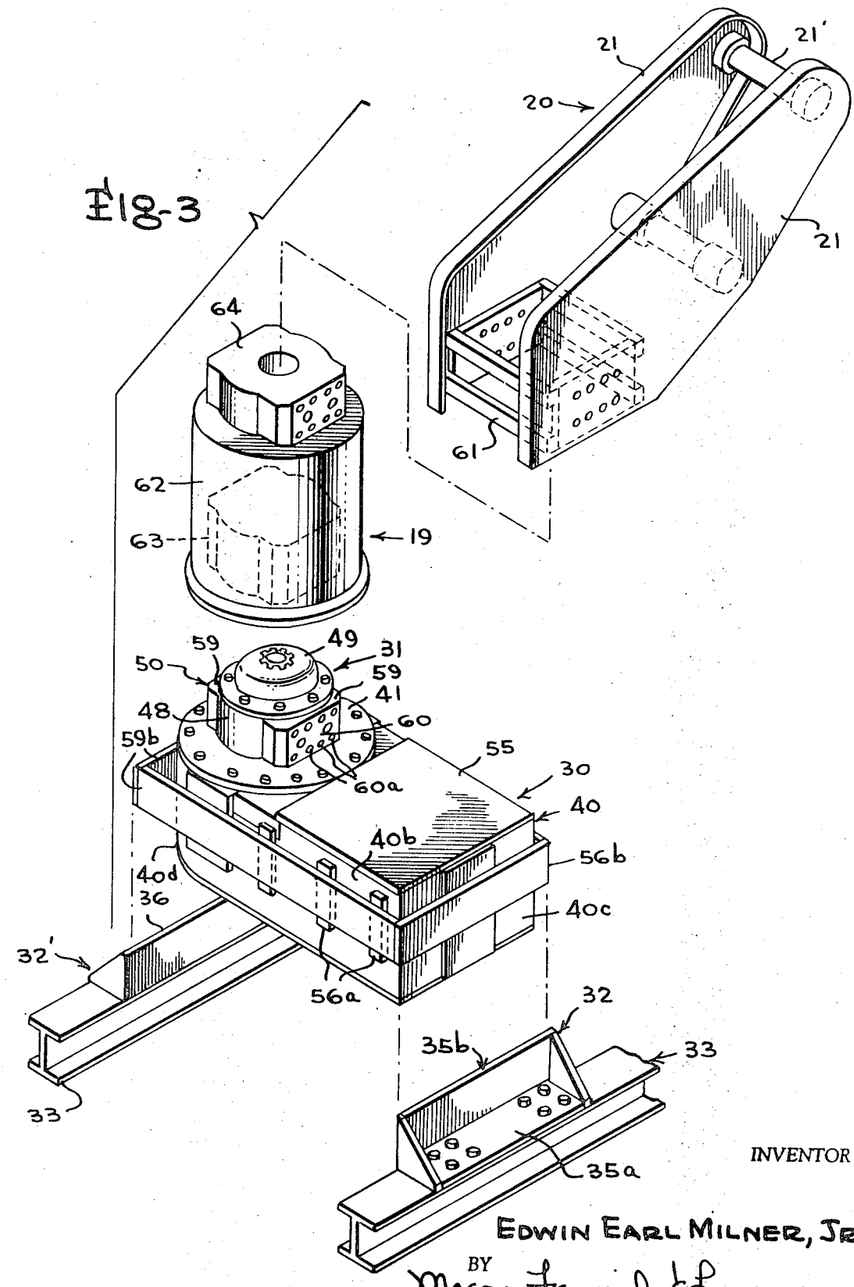
FIG. 3 is an exploded perspective view of the pedestal drive mechanism and the supporting structure therefor for the center mount installation of FIG. 1.

The boom pedestal assembly 19 basically comprises a transmission housing 30 of horizontally elongated, generally rectangular configuration from the top of which projects a rotary power head 31. This transmission housing 30 in the preferred embodiment is conveniently removably supported in nested relation between a pair of spaced mounting assemblies 32, 32' to fix the transmission housing 30 directly on the frame rails of the truck chassis. As illustrated in FIGS. 1, 2 and 3, a pair of transverse I-beams 33 are fixed on the top of the frame rails 34 of the truck chassis in spaced apart relation longitudinally of the chassis corresponding approximately to the largest horizontal dimension of the transmission housing. The tops of these I-beams 33 are substantially aligned with the top of the floor in the rear portion of the truck, and support the horizontal flanges 35a of angle iron end beams 35 which are removably bolted to the I-beams. The vertical flanges 35b of each of these beams 35 form weld plates to which the transmission housing is secured. As illustrated in FIG. 2, the transverse I-beams 33 may be of sufficient length to project outwardly somewhat beyond the truck frame rails 34 and reinforcing fishplating of angle iron construction, indicated at 38, may be welded to the frame rails 34 and to the bottom flanges of the I-beams 33.

Figure 4:
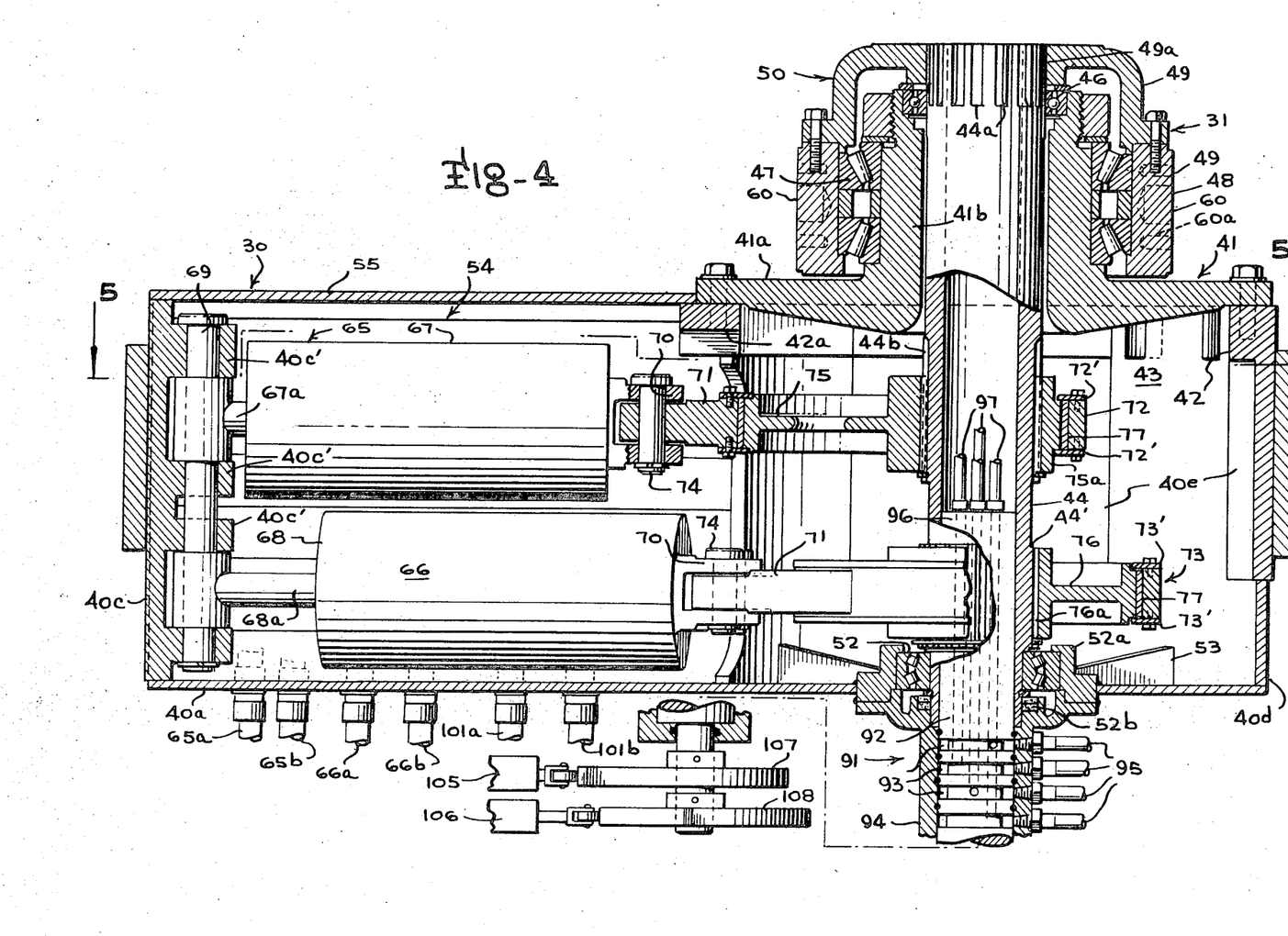
FIG. 4 is a vertical section view, to an enlarged scale, of the pedestal drive assembly taken along the line 4–4 of FIG. 2.
Figure 5:
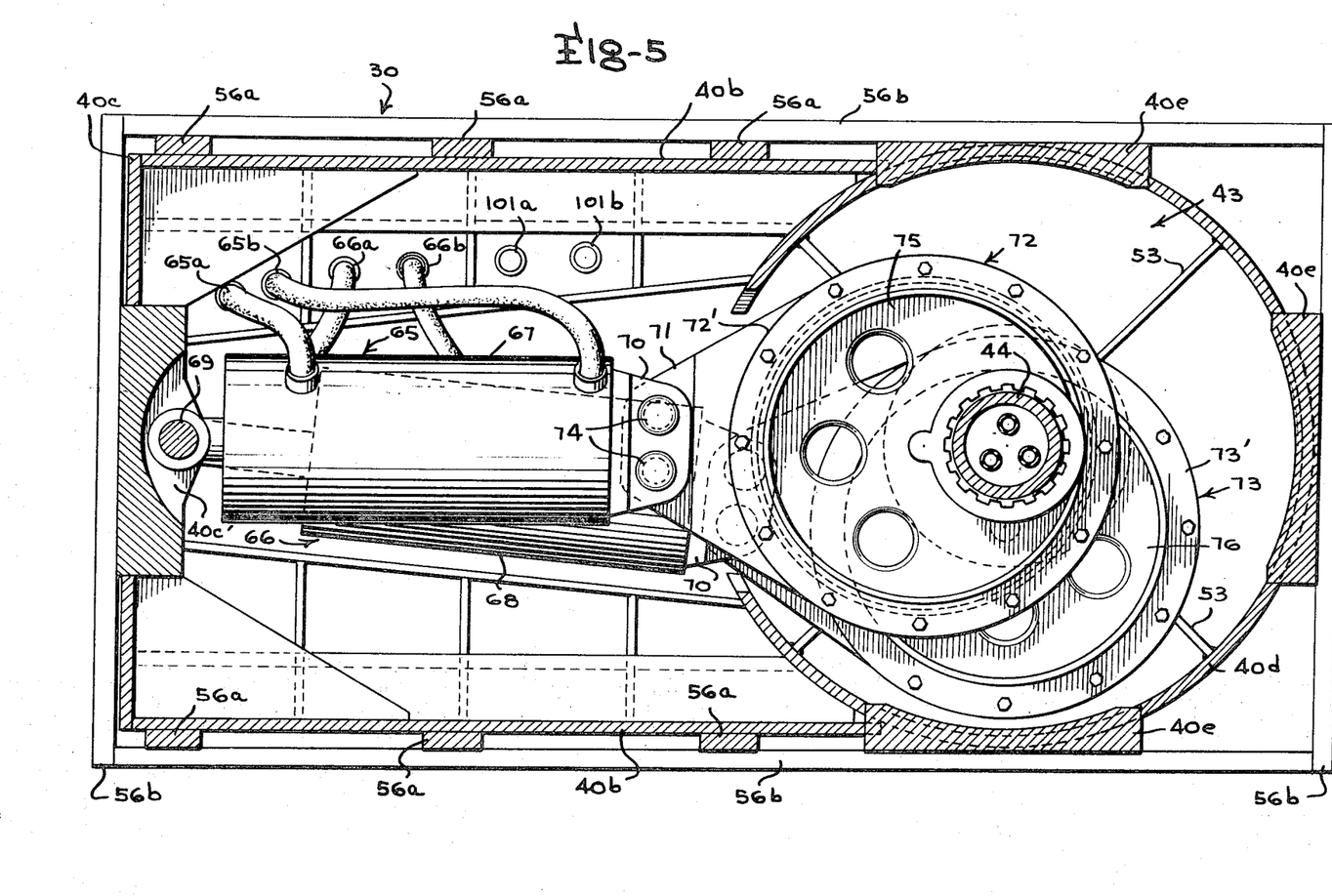
FIG. 5 is a horizontal section view taken along line 5–5 of FIG. 4.

The details of construction of the transmission housing 30 and the boom pedestal assembly components housed therein are illustrated in FIGS. 3, 4 and 5. While the housing 30 may be constructed in a variety of ways, in the embodiment herein illustrated the transmission housing 30 includes a bottom wall 40a, sidewalls 40b, and a straight end wall 40c. A cylindrical wall formation 40d, which has a large opening in the segment thereof nearest the end wall 40c and has thicker stiffener blocks 40e welded in cutouts at spaced circumferential intervals, is welded to the bottom and sidewalls. A bearing post 41 is fixed to the mounting lip or boss formations 42 at the tops of blocks 40e, and to a formation 42a spanning the opening in wall 40d to journal a hollow pivot tube or pedestal shaft 44 for rotation about a substantially vertical axis. As shown in FIGS. 4 and 5, the curved end wall formation 40d may be extended through a circumferential path of about 270 to 300° around the pivot tube 44 to define a cylindrical chamber 43 covered by the bearing post 41, the outwardly projecting flange portion 41a of the bearing post 41 being secured to the formations 42, 42a, as by bolts extending through bolt openings provided near the periphery of the flange 41a and through corresponding bolt openings in these formations. The vertically projecting cylindrical body portion 41b supports a bearing ring 46 near its upper end forming the upper journal bearing for the pivot tube 44, and on its outer periphery supports the inner race member of a spherical roller bearing assembly 47, the outer race of which is secured in an inwardly facing groove formation of a drive head ring 48 which is rigidly fastened by suitable screws to a drive cap 49 and collectively with the drive cap forms a drive head 50. The top wall of the drive cap 49 is provided with a splined center opening 49a to interfit with spline teeth 44a on the upper end of the pivot tube 44 and thus couple the tube 44 and drive head 50 together for corresponding rotation. A lower spherical roller bearing assembly 51 also has its inner race secured in a suitable outwardly facing groove in the surface of the pivot tube 44, and has its outer race secured in a confronting, inwardly facing groove in an enlarged annular boss formation 52a of the bottom wall 40a bounding the opening 52 therein through which the lower end of the pivot tube 44 projects. If desired, truncated triangular reinforcing plates 53 having their lower edges welded to the bottom wall 40 and their inner edges welded to the boss 52a may be arranged in radial planes extending outwardly from the boss to reinforce the base in this region. The region of the housing 30 between the cam chamber 43 and end wall 40c define a hydraulic cylinder chamber 54, which is covered by a top cover plate 55. Vertical steel stiffeners 56a and longitudinal stringer stiffeners 56b are secured to the side and end wall portions to define a rectangular perimeter and reinforce and stiffen the transmission housing forming in effect a bridge girder type wall construction providing the housing with the desired transverse and longitudinal stability. The end stringers 56b lie flush against, and in registry with the inwardly facing surfaces of the vertical flanges 35b of angle iron beams 35 and are welded thereto to properly locate the boltable angle iron beams so that the lower portion of the housing 30 will nest between the I-beams 33 when the angle iron beams are bolted in position.

The drive head ring 48 may have a variety of external configurations to facilitate coupling of the same to the boom head structure 20, either directly or through the intermediary of a riser block or extension where the installation conditions are such that it is inconvenient to directly connect the boom head structure to the drive head 50. In the preferred embodiment, the drive head ring 48 is provided with a pair of diametrically opposite, outwardly projecting mounting block formations 59 providing a pair of opposite, parallel, vertical flat faces 60 having threaded coupling bolt sockets 60a therein. The boom head structure 20, which may simply comprise the pair of correspondingly shaped, laterally spaced side plates 21, rigidly connected together by cross bracing members 61 extending therebetween in the lower region of the head structure, may then be readily mounted on the drive head 50 by securing the side plates 21 directly against the flat faces 60 of the mounting block formations 59 by means of heavy mounting bolts extending through appropriate apertures in the members 61 and into the coupling bolt sockets 60a. Alternatively, a companion casting can be provided, if desired, on the head structure 20 secured between the side plates 21 thereof in the lower region of the head structure, the casting being shaped to define a downwardly opening, nonround socket shaped to mate with and receive therein the drive head 50 and be bolted to the latter, to provide the direct connection between the head structure 20 and the drive head 50. If the installation conditions dictate, a riser block or extension 62, as illustrated in FIGS. 1 and 3, having a downwardly opening socket 63 in the lower end thereof, shaped in cross section corresponding to the cross-sectional external shape of the drive head ring 48 to be fitted onto the latter and bolted thereto, and having a head formation 64 on the upper end thereof corresponding in shape to the external configuration of the drive head 50 to be coupled to the head structure 20 in like manner, may be provided to intercouple the boom head structure to the drive head 50 of pedestal drive transmission units located various distances below the boom structure.

The novel means for direct coupled, hydraulically controlled driving of the pivot tube 44, and the boom structure coupled thereto, about the substantially vertical axis of pivot tube 44 is provided within the housing 30 and comprises a pair of double acting hydraulic cylinder units 65, 66, which in one preferred embodiment are arranged generally one over the other in the portion of the housing extending to the left of the shaft axis, as viewed in FIGS. 4 and 5. The hydraulic cylinder units 65, 66 comprise cylinders 67, 68, respectively having piston rods 67a, 68a. In the illustrated embodiment, the piston rods 67a, 68a are pivotally coupled at their outer ends to a thicker mounting block portion of the vertical end wall 40c of the transmission housing 30 about a common vertical pivot axis, by means of a pivot pin 69 extending through mounting lugs 40c' projecting inwardly from and integral with the housing end wall 40c and through knuckle eyes on the ends of the piston rods 67a, 68a. The ends of the cylinders 67, 68 nearest the pivot tube 44 are each provided with an integral coupling bracket formation 70 defining a pair of ears for receiving therebetween an outwardly projecting tongue formation 71 on respective circular drive rings 72 and 73. As is revealed by FIG. 5, a pair of laterally spaced apertures are provided in each of the tongue formations 71 and the ears of the coupling bracket formation 70 adapted to register with each other and receive coupling pins 74 therethrough for securing the respective drive rings 72, 73 to the cylinders 67, 68 against angular movement relative to their associated cylinders. The drive rings 72, 73 respectively surround eccentric cams 75, 76, with a suitable bushing ring 77 interposed therebetween, while the cams 75, 76 are locked against relative rotation on the pivot tube 44 by internal spline teeth 75a, 76a, interlocked with spline formations 44b, 44c on the tube 44. The drive rings are restrained in sliding engagement with their respective cams by upper and lower ring plates 72', 73' bolted to the rings 72, 73 and lapping inwardly over the edges of the associated cams. As will be apparent from FIG. 5, the cams 75, 76 are disposed in substantially 90° out-of-phase with each other—that is, the point on the periphery of cam 75 which is farthest from the axis of the pivot tube 44 lies along a radius of the tube 44, spaced approximately 90° from the point on cam 76 which is spaced farthest from the pivot tube axis. It will be apparent upon consideration of a force analysis of the effects of extending and retracting the piston rods 67a, 68a on the out-of-phase eccentric cam disks 75, 76 that by control of hydraulic fluid supplied to the opposite ends of the cylinders 75, 76, rotary drive of the pivot tube 44 to any desired angular positions can be readily achieved by conventional hydraulic fluid control mechanisms. By reason of the continuous control of the angular position of each of the eccentric cams 75, 76 achieved by the drive rings respectively surrounding the same which are securely held against angular movement relative to their respective cylinders 65, 66, the angular position of the pivot tube 44, and therefore of the boom head structure 20, connected thereto, is always positively controlled by the control of the hydraulic fluid supply to the cylinders. However, because of the particular transmission structure hereinbefore described, it will be apparent that all bending moments or loads imposed by the boom structure will be resisted, first by the head structure 20, and then by the roller bearing assembly 47 and the bearing post 41 supporting the drive head 50 by the roller bearing assembly 47, without imposing such bending moments on the pivot tube 44. By this particular structural arrangement, the pivot tube is subjected only to torque loading and thus is not subjected to the severe strains of bending moments on the boom structure.

Figures 6, 10:
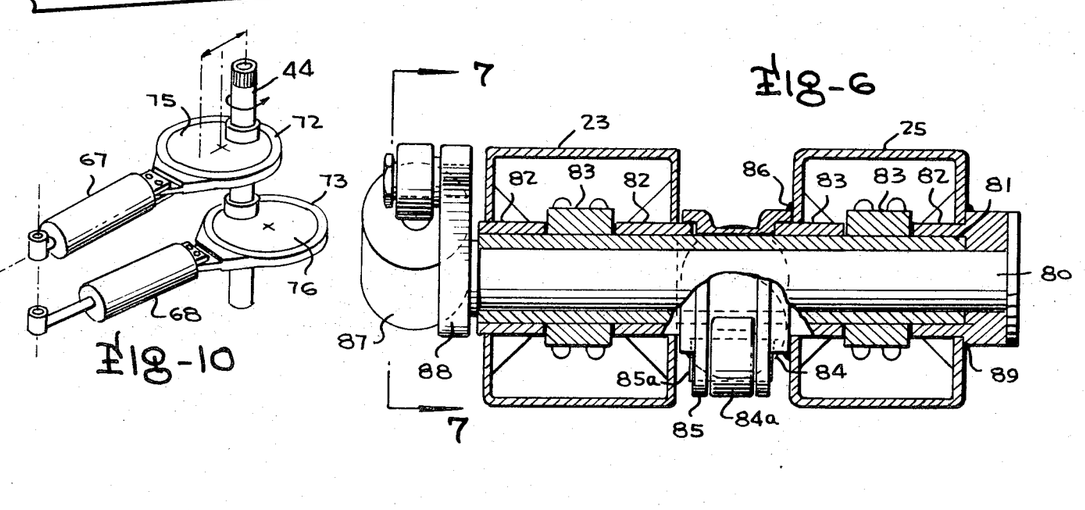
FIG. 6 is a transverse vertical section view taken through the articulation assembly of the articulated boom structure, along the line 6–6 of FIG. 1.
FIG. 10 is a fragmentary perspective view in somewhat diagrammatic form illustrating the driving connection between the hydraulic cylinders and the eccentric cams on the pivot tube.
Figure 7:
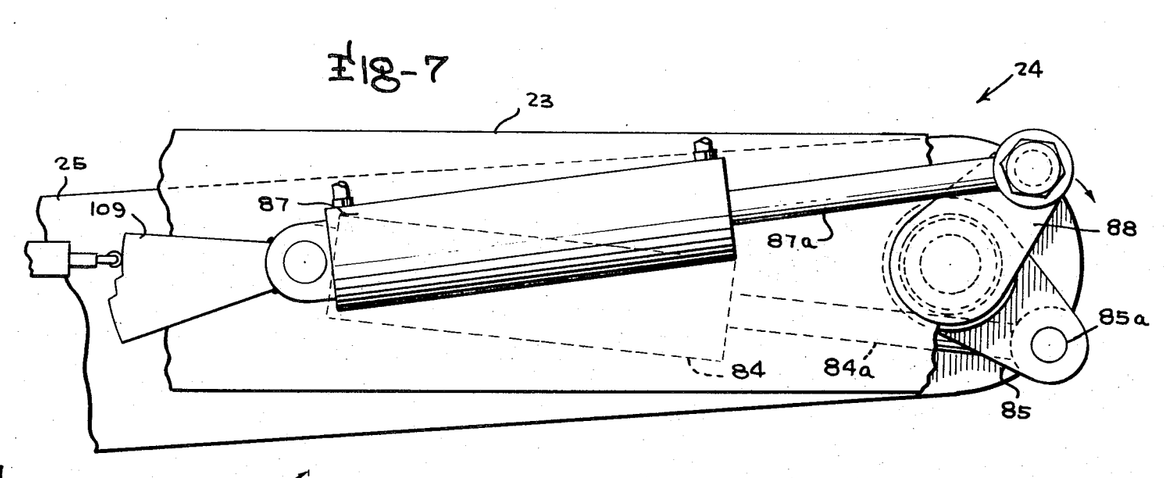
FIG. 7 is a vertical section view taken along the line 7–7 of FIG. 6.

The articulation assembly 24 providing the pivotal coupling between the inner or main boom section 23 and the outer boom section 25 is also provided with a hydraulic cylinder drive mechanism which is similar in concept to that provided for the boom pedestal. Referring now to FIGS. 6 and 7, the articulation assembly 24 comprises a pivot shaft 80 extending through both the inner boom 23 and the outer boom 25 adjacent the outermost end of the former, defining the common pivot axis for the articulation joint. A sleeve 81 surrounds the pivot shaft 80 and is freely rotatable thereon, and is journaled for free rotation in bushing segments 82 of the respective booms 23, 25. Sprockets 83 disposed within the hollow booms 23 and 25 and fixed to the sleeve 81 are provided for the chain and sprocket type basket leveling system, which may be of conventional construction, and forms no part of the present invention. A first double acting hydraulic cylinder 84 is provided between the two booms 23, 24, having its end remote from the pivot shaft 80 pivotally connected to the main boom 23, and having a piston rod 84a pivotally coupled, as indicated at 85a, to a first knuckle lever 85 rotatably journaled on the sleeve 81 between the two boom sections and secured to the outer boom section 25, as by welds 86. A second double acting hydraulic cylinder 87 is also pivotally secured to the inner boom section 23 at its end remote from the axis of the pivot shaft 80, for example on an axis common with the pivot axis at which the cylinder 84 is secured to the boom section 23, and has a piston rod 87a pivotally coupled to a second knuckle lever 88 outboard of the main boom section 23, which is fixed to the end of the pivot shaft 80. The pivot shaft 80 is also secured to the outer boom section 25, as by the weld 89 at the end thereof opposite the cylinder 87. The two knuckle levers 85 and 88 are disposed in substantially 90° relation to each other, forming respectively eccentric crank members secured to the outer boom section 25 and to the pivot shaft 80, with the axes of the cylinders 84, 87 disposed in angular relation to each other. The purpose of this arrangement of the knuckle levers and cylinders in angular relation to each other is to insure that one of the cylinders, and its associated knuckle lever, is at a favorable position to provide power and leverage for swinging the outer boom section 25 about the axis of the pivot shaft 80 whenever the piston rod of the other cylinder is in a dead center position. For example, if the piston rod 84a has been retracted from the position illustrated in FIG. 7 to a position disposing the longitudinal axis of the piston rod 84a in exact alignment with the center axis of the pivot shaft 80, the knuckle lever 88 will then be in an approximately six o'clock position, as viewed in FIG. 7, thus providing adequate leverage for rotating the outer boom 25 when the piston rod 84a is in its unfavorable leverage position. By this construction, reliable control of the angular position of the outer boom section 25 relative to the inner boom section 23 is insured through an angular range of approximately 270°.

Figure 8:
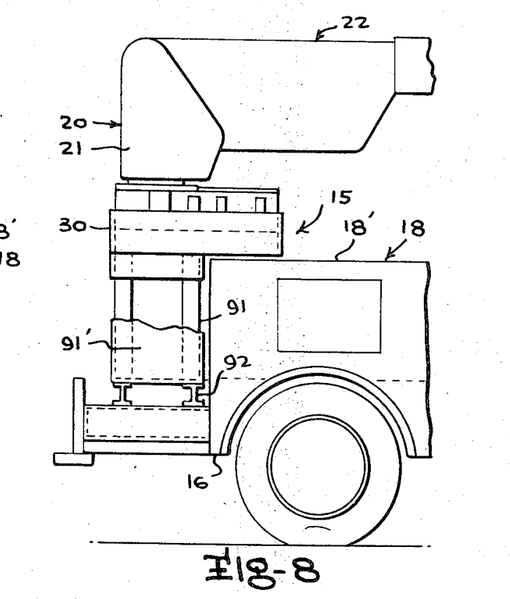
FIG. 8 is a fragmentary side elevation view illustrating a typical installation of the pedestal drive assembly as a corner mount installation on the rear of a utility maintenance truck.
Figure 9:
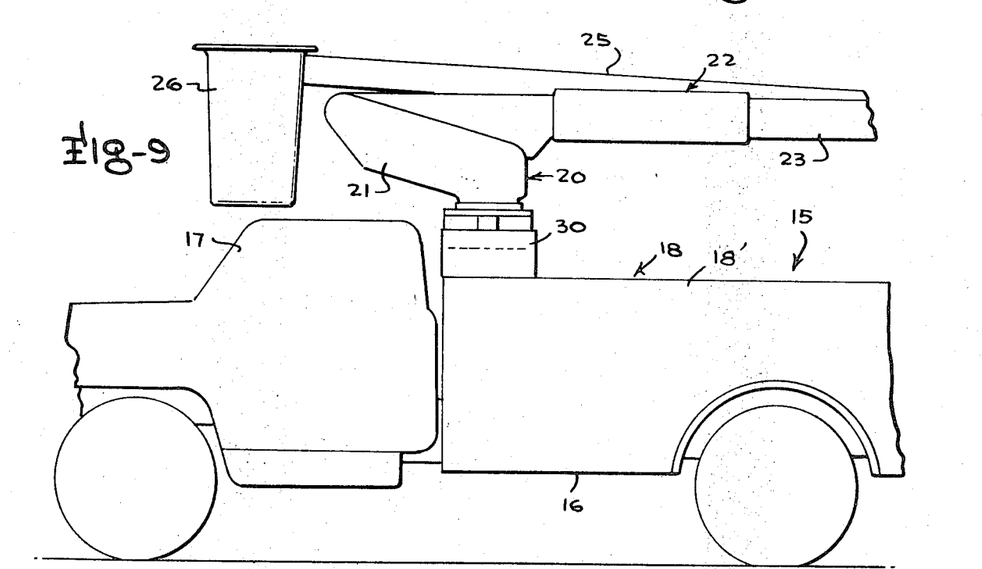
FIG. 9 is a fragmentary side elevation illustrating a typical forward bridge mount installation for the pedestal drive mechanism.

The pedestal drive assembly herein described is quite versatile and lends itself readily to a wide variety of utility truck installations. For example, instead of employing the center mount installation illustrated in FIGS. 1 and 2, the unit can be readily employed as a rear corner mount installation, as illustrated, for example, in FIG. 8, by simply providing an angle iron framework structure 91, covered if desired by cover plates 91', to support the bottom of the transmission housing 30 at an appropriate elevation above the truck bed 92. The purpose of the angle iron framework 91 is merely to provide a supporting base for the bottom of the transmission housing 30 at a level corresponding substantially to the top of the sidewall sections 18' to place the transmission and the boom structure at an appropriate elevation on the truck. Similarly, the transmission housing may be readily employed as a bridge type mount, as illustrated in FIG. 9, disposed immediately rearwardly of the driver's cab 17 and supported on frame structure similar to that indicated at 91 in FIG. 8. If installation conditions dictate, the boltable angle iron beams 35 may be welded to the side stringers 56b rather than the end stringers and bolted to I-beams which parallel the longitudinal axis of the housing 30.

Figure 11:
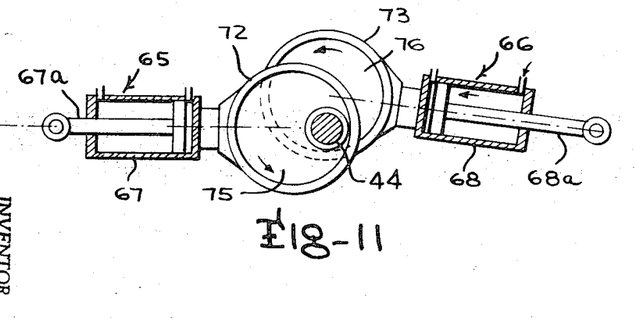
FIGS. 11 and 12 are diagrammatic views of alternative cylinder arrangements that may be provided to drive the pivot tube.
Figure 12:
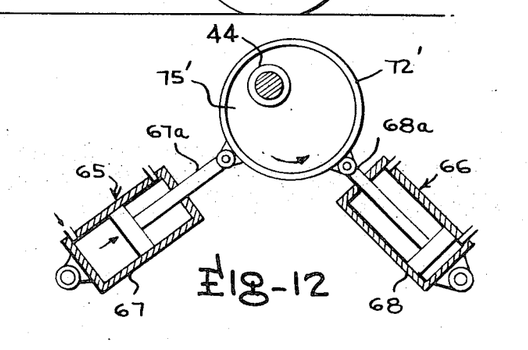

Instead of forming the transmission housing 30 with the hydraulic cylinder chamber located to one side of the shaft axis in the configuration shown in FIGS. 1 to 5, the housing 30 can be further elongated, for example, to span the transverse width of the utility body 16 to provide a bridge mount installation as shown in FIG. 9, with the pivot tube 44 located at the center of the housing and hydraulic cylinder chambers disposed at opposite sides of the shaft. In this case the cylinders 65, 66 will be disposed on opposite sides of the shaft axis, as diagrammatically illustrated in FIG. 11. Also, to suit desired installation conditions, the hydraulic cylinder units 65, 66 can be disposed at right angles to each other, as illustrated in FIG. 12, and still obtain the same positive drive and control of the angular position of the pivot tube 44. In the arrangement of FIG. 12, a single eccentric cam 75' and ring 72' can be employed with both hydraulic cylinders or both piston rods connected to the same ring 72', in view of the right angular disposition of the two hydraulic cylinder units.

The foregoing boom pedestal assembly also provides a convenient construction for associating a fluid transfer collector block with the lower end of the pivot tube 44 and coupling hoses through the hollow bore of the tube 44 to the basket for remote control by the occupant of the basket of the hydraulic system of the utility maintenance truck. As illustrated in FIG. 4, the collector block assembly 91 may comprise a cylindrical body 92 projecting upwardly into the lower portion of the bore pivot tube 44 and keyed thereto, having vertically spaced fluid conveying circumferential channels 93 formed in the periphery thereof and located below the bottom of the transmission housing 30, disposed within a cap member 94 sealed at its upper end by oil seals 52b bearing against the lower end portions of pivot tube 44 and having vertically spaced ports therein coupled by suitable fittings to hydraulic fluid hoses 95. Internal conduits 96 within the cylindrical body 92 communicate the respective peripheral channels 93 with hoses 97 connected thereto by suitable couplings at the top of the body 92, the hoses 97 leading upwardly through the bore of the pivot tube 44 and through the boom sections to the conventional control valve unit on the basket 26.

Figure 13:
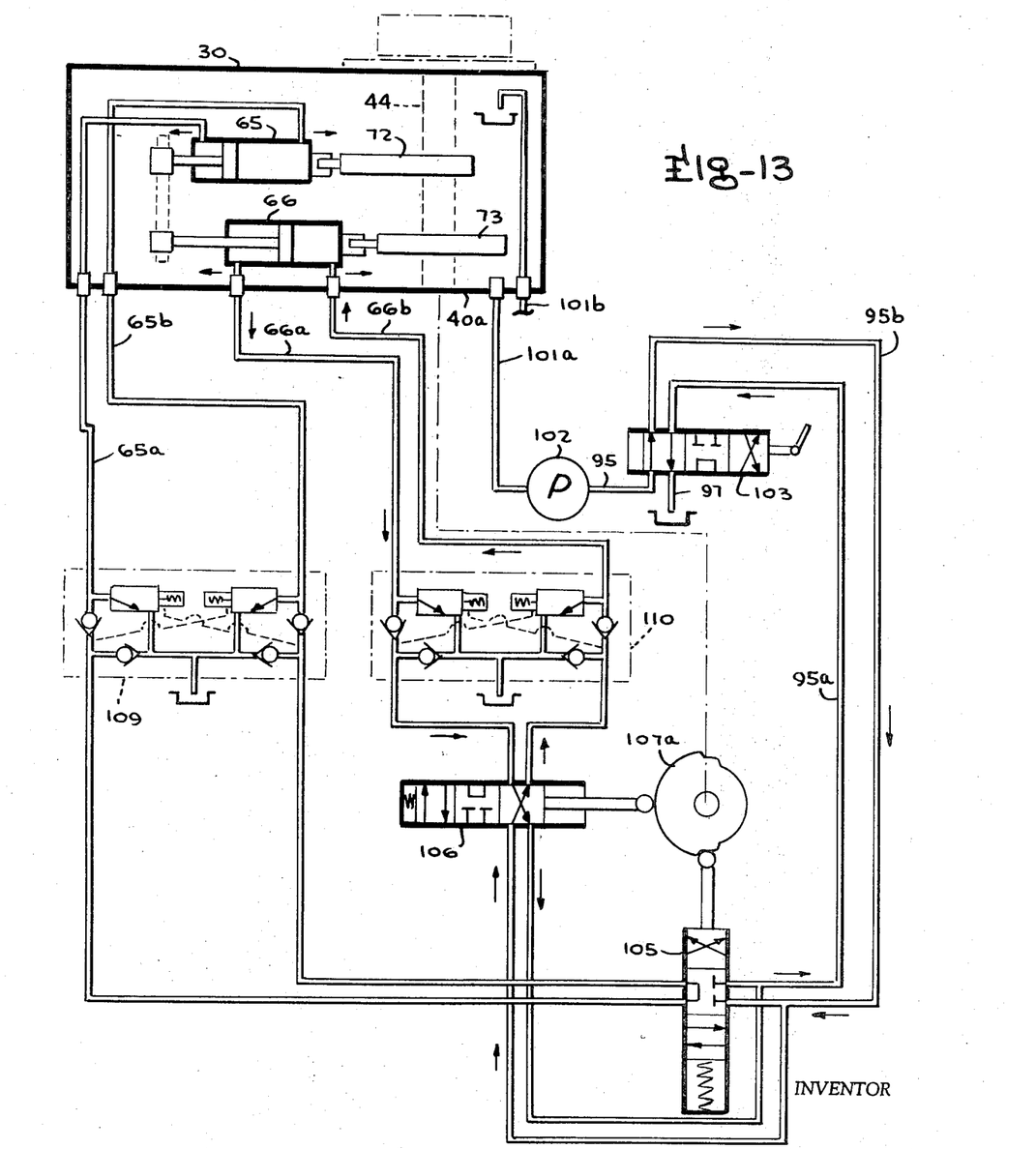
FIG. 13 is a schematic fluid circuit diagram of a hydraulic control circuit which may be used in the present invention.

One form of hydraulic control circuit which may be used to control the hydraulic cylinder units of the above described boom pedestal assembly is illustrated schematically in FIG. 13. In this embodiment of the control circuit, the transmission housing 30 is a sealed, fluid tight chamber which forms the hydraulic fluid reservoir for the hydraulic control system, and has hydraulic fluid supply and return hoses 101a and 101b, respectively, communicating with the interior, as by connecting them to fittings in the bottom wall 40a of the housing 30. Also, hydraulic fluid lines 65a, 65b, and 66a, 66b, may be coupled through the bottom wall 40a to the respective hydraulic cylinders 65, 66, for advancing the cylinders toward the pivot tube 44 when fluid is supplied to the lines 65a, 66a, and for retracting the cylinders in a direction away from the pivot tube 44 when fluid is supplied to the lines 65b, 66b. These fluid conduits are also shown in FIGS. 4 and 5. The supply hose 101a is coupled to the inlet of a suitable pump 102, the outlet of which supplies the hydraulic fluid under pressure to a manually operable master control valve 103 located, for example, on the basket for operation by the occupant of the basket and if desired to another like master control valve (not shown) on the pedestal connected in parallel with the master control valve 103. It will be appreciated that the pump supply and reservoir return lines to the control valve 103 include the hoses 95 and 97 interconnected through the connector block assembly 91, previously described. The hydraulic cylinder control lines 65a, 65b, and 66a, 66b, are connected through cam actuated reciprocating pilot valves 105 and 106, respectively, to the control ports of the control valve 103, for example, through manifold lines indicated by the reference characters 95a and 95b. The movable valve members of the pilot valves 105, 106, in one embodiment, may be disposed in a common vertical plane and controlled by a pair of cams 107, 108, respectively, located below the collector block assembly 91 and fixed to a downwardly extending portion of the collector block assembly body 92, keyed to the pivot tube 44, as illustrated in FIG. 4, so that the cams 107, 108 monitor the angular position of the pivot tube 44. The angular positions of the pilot valve control cams 107, 108 are respectively related to the angular positions of the eccentric cams 75, 76, so that the valves 105, 106 will reverse the fluid connections to their associated cylinder units 65, 66 when the associated cylinder reaches the dead center position with respect to the axis of the pivot tube 44. Preferably, however, the pilot valves 105, 106 are arranged at right angles to each other and controlled by a single cam 107a, shown in FIG. 13, the valves 105, 106 and cam 107a being installed in the housing 30 in the zone between the eccentric cams 75, 76. The profile configuration of each of the cams 107, 108 and 107a is substantially that illustrated for cam 107a in FIG. 13, wherein a short step or dwell portion is provided at the transition from the largest radius portion to the smaller radius portion, during which the associated pilot valve 105, 106 is held in a neutral position to avoid interference of the cylinder which is in the dead center position with the action of the other cylinder.

Although the control lines 65a, 65b and 66a, 66b can be directly connected to the pilot valves 105, 106, in the preferred embodiment illustrated in FIG. 13, pilot operated check valves 109, 110 are interposed between the pilot valves 105, 106 and their respective associated cylinder units 65, 66. These valves 109, 110 are, for example, of the construction of the Motion Control and Lock Valve manufactured by Fluid Controls, Inc., of Mentor, Ohio, designated Model 1EEC11 and 1EEC12, having check valves and relief valves including pilot over-ride pistons, connected as indicated schematically in FIG. 13. The relief valves are set, as is well known to those skilled in the art, to open at a pressure slightly greater than the maximum pressure which the load can exert at any time, so that positive pump pressure is always required to move the piston of the associated cylinder unit and the load will be instantly locked when pump flow is stopped. These pilot operated check valves 109, 110 serve as a holding valve to lock the boom at any position without drift, provide overload protection against excessive side pull on the boom, provide volumetric control permitting spill-off and/or make-up of oil in the associated cylinder unit when required, prevent the boom from over-running the pump, relieve excess pressures which build up due to thermal expansion, and provide smooth acceleration and deceleration by relieving surges caused by sudden shifting of the control valve.

Assuming the fluid controls to be in the position illustrated in FIG. 13, it will be appreciated that with the control valve 103 in the position shown, hydraulic fluid will be withdrawn from the reservoir formed by the transmission housing 30 through the line 101a by the pump 102 and discharged therefrom through the control valve 103 to the pilot valves 105, 106. The pilot valve 105 being in the neutral position as shown, the cylinder 65 is in a free-floating condition. The pilot valve 106 transmits the hydraulic fluid through valve 110 to the control line 66b and cylinder 66, causing the cylinder 66 to advance toward the pivot tube 44 and thus effect rotation of the pilot tube in a counterclockwise direction, as viewed in FIG. 5. When the eccentric cam 76 has been shifted approximately 90° from the position shown in FIG. 5, disposing the longitudinal axis of the cylinder unit 66 at the dead center position intersecting the axis of the pivot tube 44, the cam follower for the pilot valve 106 reaches the step or dwell at the top of the cam, as viewed in FIG. 13, shifting the pilot valve 106 to the neutral position to place the cylinder unit 66 in floating condition. At this time, the cam follower of pilot valve 105 is riding on the larger diameter portion of the cam 107a, conditioning the pilot valve 105 to supply pressurized fluid through valve 109 to the control line 65b and cylinder 65, so that the cylinder 65 is progressively advancing to force the eccentric cam 75, now positioned at approximately the six o'clock position, as viewed in FIG. 5, to rotate in counterclockwise direction and thus providing the force to continue rotation of the pivot tube 44. When it is desired to stop rotation of the pivot tube 44, the control valve 103 is manually adjusted to the neutral position, terminating the supply of hydraulic fluid to the cylinder units 65 and 66 and holding them in the positions which they occupy. It is believed that this description of a portion of the cycle of operation of the hydraulic control system will be adequate to afford persons skilled in the art with a full understanding of the manner in which the hydraulic control system effects operation of the cylinder units 65, 66.

The hydraulic control system for regulating flow of fluid to the cylinders 84, 87 controlling angular movement of the boom section 25 about the articulation joint at shaft 80 may be similar to that provided for rotating the pivot tube 44. In this case, however, the cams which control the pilot valves in the embodiment shown in FIG. 7, are sector cams monitoring the arcuate movement of the cylinders 84, 87, one of which is shown at 109 in FIG. 7. The operation of the hydraulic system for elevating and lowering the boom section 25 is similar to the system of FIG. 13, the pilot valves being adjusted by the sector cams rigidly fixed to the cylinders 84, 87 and rocking with the cylinders about their pivot axes to appropriately regulate the direction of fluid flow to the cylinders for advancing or retracting their piston rods so as to achieve proper rotation of the knuckle levers 85 and 88.

While drive systems for the pivot tube using two hydraulic cylinder units in various relative locations have been specifically described, it will be apparent that a larger number of hydraulic cylinders may be used, such as four cylinders, or more, coupled by rings, such as rings 72, 73, to an equal number of eccentric circular cams on the pivot tube, or coupled at circumferentially spaced locations to a single ring surrounding a single eccentric cam, similar to ring 72' and cam 75', shown in FIG. 12, to provide greater driving power for rotating and positioning the pivot tube and its associated boom structure.

I claim:

1. A boom structure for mobile boom equipment comprising a boom head, a boom coupled to said boom head for movement therewith about a generally vertical reference axis, a hydraulic transmission unit for supporting and driving said boom about said axis including a transmission housing, an upright pivot tube journaled at vertically spaced positions within said housing for rotary movement about said axis, means coupling said boom head to said pivot tube for rotation of the boom and boom head in azimuth by said pivot tube, eccentric cam means within said housing fixed against relative rotation on said pivot tube and defining an eccentric circular periphery of larger diameter than said pivot tube, circular drive ring means in circumferentially continuous encircling sliding engagement with the periphery of said cam means, and a pair of axially extensible hydraulic cylinder units in said housing each having an anchored end pivotally supported by said housing at a stationary pivot axis paralleling said pivot tube axis and a movable working end connected to said drive ring means to collectively drive said drive ring means and their associated cam means in eccentrically orbiting paths about the pivot tube axis forcing said pivot tube to rotate to any selected angular position about said reference axis by relative extension and retraction of said cylinder units, said drive ring means and cam means having a range of movement to impart continuous rotation to said pivot tube in either direction through plural revolutions.

2. A boom structure as defined in claim 1, wherein said cam means comprise a pair of vertically spaced circular cam members having their respective common diameters with said pivot tube inclined at a substantial angle to each other, each having a respective drive ring encircling the same.

3. A boom structure as defined in claim 1, wherein said cam means comprise a pair of vertically spaced circular cam members having their respective common diameters with said pivot tube inclined at angles of about 90° to each other, each having a respective drive ring encircling the same.

4. A boom structure as defined in claim 3, wherein said pair of hydraulic cylinder units are each respectively secured at their movable ends to a respective one of said drive rings to hold the associated drive ring against angular movement relative to the axis of extension and retraction movement of said movable ends.

5. A boom structure as defined in claim 4, wherein said hydraulic cylinder units each have an elongated cylinder and a piston rod which are relatively reciprocative along respective extension axes, the cylinder units and their extension axes being arranged substantially one above the other with their connections to said drive rings located on the same side of the pivot tube axis.

6. A boom structure as defined in claim 4, wherein said hydraulic cylinder units each have an elongated cylinder and a piston rod which are relatively reciprocative along respective extension axes, the cylinder units being located at substantially diametrically opposite positions relative to the pivot tube axis at opposite sides of said cam means.

7. A boom structure as defined in claim 1, wherein said cam means and drive ring means each respectively comprise a single cam member and a single drive ring, said movable ends of said pair of cylinder units being connected to said drive ring at circumferentially spaced points with the extension axes of said cylinder units disposed at an angle of about 90° to each other.

8. A boom structure as defined in claim 1, wherein said housing comprises a substantially rectangular box-like structure having considerably shallower vertical dimensions than its horizontal dimensions, said pivot tube having an upwardly protruding portion projecting above the top of said housing, said cylinder units being located in portions of said housing extending laterally to one side of said pivot tube and said means coupling said boom head to said pivot tube comprising drive head means rotatably supported by said housing by bearing means which transmit bending moments from said boom to said housing without imposing substantial bending moments on said pivot tube.

9. A boom structure as defined in claim 4, wherein said housing comprises a substantially rectangular box-like structure having considerably shallower vertical dimensions than its horizontal dimensions, and said pivot tube having an upwardly protruding portion projecting above the top of said housing, said housing having a cam chamber for accommodating said cam members and drive rings and a chamber communicating therewith extending laterally therefrom in a direction perpendicular to pivot tube axis for accommodating said cylinder units therein, and said means coupling said boom head to said pivot tube comprising drive head means rotatably supported by said housing by bearing means which transmit bending moments from said boom to said housing without imposing substantial bending moments on said pivot tube.

10. A boom structure as defined in claim 9, wherein said housing includes two pairs of respectively opposite parallel horizontally elongated outer vertical wall members interconnected to form a rectangular peripheral frame about the exterior thereof, a pair of boltable angle iron members having vertical flanges secured to the opposite vertical wall members of one of said pairs and having horizontal flanges projecting outwardly from the vertical flanges to rest upon and be bolted to a pair of spaced parallel supporting beams.

11. A boom structure as defined in claim 1, wherein said housing includes two pairs of respectively opposite parallel horizontally elongated outer vertical wall members interconnected to form a rectangular peripheral frame about the exterior thereof, a pair of boltable angle iron members having vertical flanges secured to the opposite vertical wall members of one of said pairs and having horizontal flanges projecting outwardly from the vertical flanges to rest upon and be bolted to a pair of spaced parallel supporting beams.

12. In a boom structure as defined in claim 11, said housing having inner side and end wall members spanning the height of the housing and spaced inwardly from said outer vertical wall members, and vertically elongated stiffening and reinforcing plates interposed between said inner and outer wall members and secured thereto to collectively form bridge girder type walls imparting transverse and longitudinal stability to the housing.

13. In a boom structure as defined in claim 1, said housing having two pairs of horizontally elongated outer vertical wall members interconnected to form a rectangular frame and inner side and end wall members spanning the height of the housing and spaced inwardly from said outer vertical wall members, and vertically elongated stiffening and reinforcing plates interposed between said inner and outer wall members and secured thereto to collectively form bridge girder type walls imparting transverse and longitudinal stability to the housing.

14. A boom structure as defined in claim 13, wherein one of the end walls and portions of the side walls of said housing are formed of a cylindrical wall member concentric with said pivot tube and located within the frame formed by said outer wall members, and said cylindrical wall member defining a cam chamber for accommodating said cam means therein and having an opening for passage of portions of said cylinder units into said cam chamber.

15. A boom structure as defined in claim 1, including a hydraulic control circuit for controlling movement of said cylinder units having manually adjustable valve means to control application of hydraulic fluid to said cylinder units for starting and stopping driving of said pivot tube and controlling the direction of rotation thereof, valve controlling cam means driven by said pivot tube in continuously coordinated relation to the angular positions of said eccentric cam means, and pilot valve means intercoupled in said hydraulic control circuit and regulated by said valve controlling cam means for automatically reversing fluid flow to the respective cylinder units when their extension axes pass through dead center positions relative to the pivot tube axis.

16. A boom structure as defined in claim 1, including a hydraulic control circuit for controlling movement of said cylinder units having manually adjustable valve means to control application of hydraulic fluid to said cylinder units for starting and stopping driving of said pivot tube and controlling the direction of rotation thereof, valve controlling cam means driven by said pivot tube in continuously coordinated relation to the angular positions of said eccentric cam means, pilot valve means intercoupled in said hydraulic control circuit and regulated by said valve controlling cam means for automatically reversing fluid flow to the respective cylinder units when their extension axes pass through dead center positions relative to the pivot tube axis, and said transmission housing being a fluid tight chamber connected to said hydraulic circuit and forming the hydraulic fluid reservoir therefor.

17. A boom structure as defined in claim 1, including a hydraulic control circuit for controlling movement of said cylinder units having manually adjustable valve means to control application of hydraulic fluid to said cylinder units for starting and stopping driving of said pivot tube and controlling the direction of rotation thereof, and said transmission housing being a fluid tight chamber connected to said hydraulic circuit and forming the hydraulic fluid reservoir therefor.